Patented Sept. 27, 1932

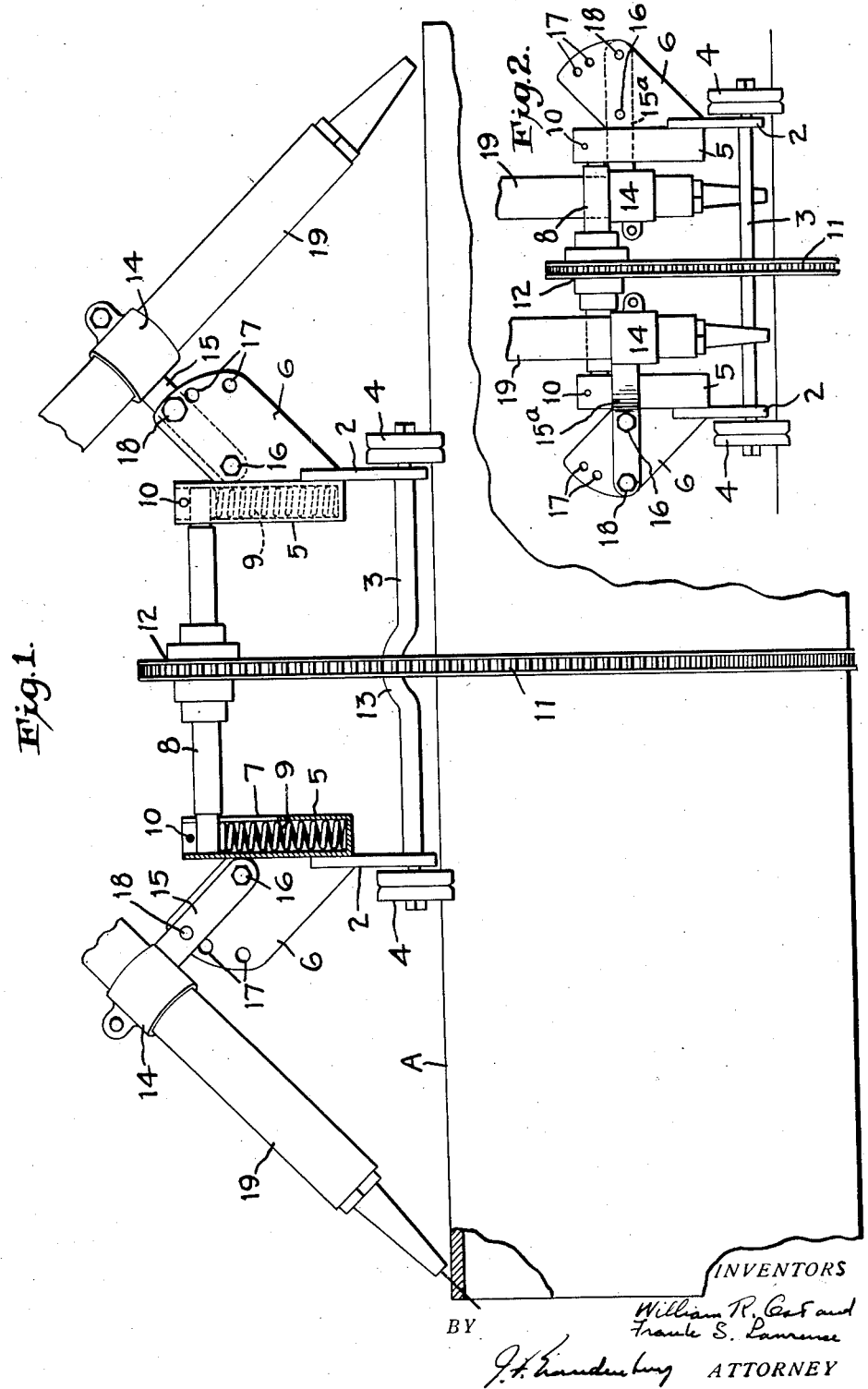

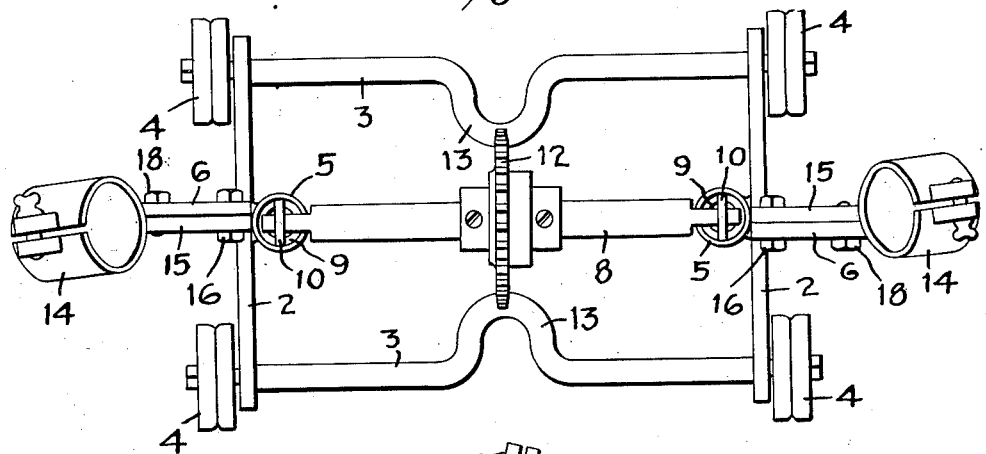
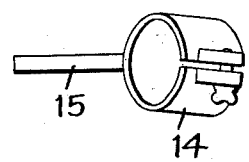
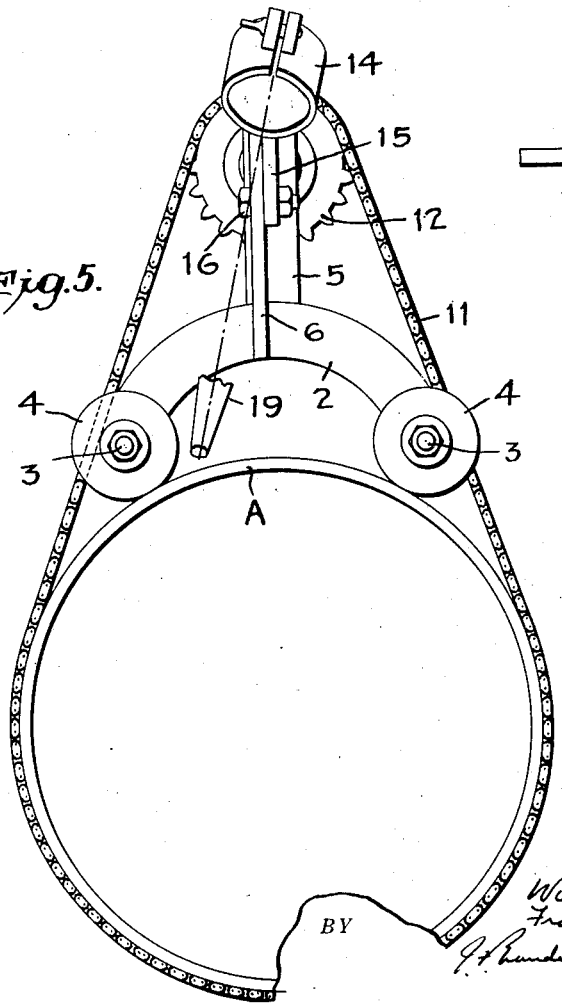

1,879,444

UNITED STATES PATENT OFFICE

WILLIAM R. OST, OF VERONA, AND FRANK S. LAWRENCE, OF DUNELLEN, NEW JERSEY, ASSIGNORS TO AIR REDUCTION COMPANY, INCORPORATED, OF NEW YORK, N. Y., A CORPORATION OF NEW YORK

CIRCUMFERENTIAL PIPE CUTTING OR WELDING APPARATUS

Application filed November 6, 1931. Serial No. 573,356.

In the application of Frank S. Lawrence, Serial No. 553,788, filed July 29, 1931 is disclosed a torch carriage held to a pipe by an endless loop or sling which passes about the pipe and over a wheel or guide on the carriage, springs on the carriage holding this sling in sufficient tension to clasp the pipe without slippage, the whole serving to keep the carriage in a true circular course when either the carriage is revolved about the pipe or the pipe is turned beneath the carriage. Properties of a sprocket chain cooperating with a sprocket wheel on the carriage were utilized for this purpose, to particular advantage.

In the machine of the Lawrence application a mechanical drive was geared to the sprocket wheel. It has been ascertained that, in such an apparatus, the true running of the carriage on the pipe, with no deviation from a perpendicular plane, does not require a mechanical drive for rotating the sprocket wheel, and that even a lightly tensioned chain will keep itself and the carriage to an exact equator or zone if the carriage is simply pushed or pulled by direct handling. An apparatus of the simplest and most inexpensive construction employed in this manner will circumferentially cut, trim or bevel pipe with surprising accuracy and smoothness. While the operation is practically a hand operation the result is quite different in kind from what can be achieved by ordinary hand cutting. Furthermore, the work can be done expeditiously and with saving of gases.

At a small expense for equipment, additional to the torch, it thus becomes possible to trim and bevel the ends of pipe for welding, at one quick, clean and accurate cut, whereas ordinarily a hand cutter will first trim the end, or cut the section to length, by one rather rough cut, and then by further use of the torch nibble off the edge to an approximate bevel.

The simplified apparatus which we have devised is useful for cutting out couplings or other portions of existing pipe lines, or for any other circular cutting of pipe, tube, or hollow bodies. With the use of a welding torch instead of a cutting torch, the apparatus can be used for making circumferential welds between the ends of pipe sections.

The utility of the apparatus is increased by providing it with torch holders at both sides, these torch holders being adjustable for different angles of cutting. Also, the torch holders may be disposed either outside the carriage, or between the sides of the carriage, the latter arrangement being helpful, for example, when narrow sections or bands are to be cut out of pipe lines.

In order to cause the oxygen jet to operate at an advantageous angular lead, the torch sockets are set at a skew on simple arms which are pivoted to bracket plates on the sides of the carriage.

The cost of the torch carriage is reduced to a minimum by the exceptionally simple, yet strong and adequate, construction which will be described.

In the accompanying drawings forming a part hereof:

Fig. 1 is what may be termed a front elevation of the apparatus applied to a pipe. The pipe is broken away in various places, and a portion of the carriage is shown in section. Two torches are shown in the holders, to illustrate possibilities, but only one torch is shown in action, the work being done being the trimming and beveling of an end of the pipe.

Fig. 2 is a similar elevation, showing the torches disposed between the sides of the carriage. In this view and in Fig. 1, it will be understood that either one torch or two torches may be used, and that for most purposes only one torch will be put in one holder or the other.

Fig. 3 is a plan view of the carriage.

Fig. 4 is a view of a torch socket set at a reverse skew on its arm.

Fig. 5 is what may be termed a side elevation of the apparatus applied to a pipe.

The carriage consists of two side pieces 2 rigidly united by two rods 3, the projecting ends of which form axles for wheels 4. Two spring tubes 5 are welded to the side pieces, and welded to the side plates and the spring tubes are two outwardly projecting wing brackets 6.

The spring tubes 5 have slots 7 in their inner sides to receive and laterally confine the ends of a sprocket wheel shaft 8, which ends are acted upon by springs 9 in the tubes. Cross-pins 10 in the tops of the spring tubes keep the sprocket shaft in assembly with the carriage. The spring pressure is light.

The sprocket chain 11 is passed about the pipe A and over the sprocket wheel 12 on the center of the shaft, and its ends are fastened. When the chain is to be fastened or unfastened, the shaft 8 is depressed, which can be done by direct hand pressure, so as to make slack in the chain.

The axle rods 3 are kinked at 13, to insure clearance for the chain 11 in the use of the apparatus on pipe of comparatively small diameter.

The torch clamps 14 are fixed to short arms 15, which are pivotally connected at 16 to the bracket plates 6. The torch holders can thus be clamped at any angle in a vertical transverse plane, but preferably each bracket has a series of holes 17 corresponding to 90°, 60° and 45°, or other useful lateral, inclinations of the torch, which can be quickly set by engaging a pin 18 on the arm with the proper hole.

The torches 19 may be understood to be cutting torches, but welding torches may be inserted in the holders. In most cases one torch will be mounted at the carriage, and it can be placed at either side. At the left of Fig. 1 a cutting torch is shown in action cutting a bevel end on the pipe. Notwithstanding that the carriage is pushed or pulled by directly grasping and moving the carriage, the cut is executed with extraordinary accuracy.

The carriage may be revolved in this manner entirely around the pipe, or if the pipe section is free and on a roller cradle, it can be turned from time to time by a helper so that the person grasping the carriage can operate on top of the pipe or in a convenient arc without having to pass the carriage through a complete circle. Naturally, the carriage could be held stationary, by hand or mechanically, while the pipe was turned continuously at more or less uniform speed.

Fig. 2 illustrate the fact that the open construction of the carriage permits the torch-holders, or either of them, to be swung inside of the carriage. This is useful for cutting out a short piece, or a coupling, in a pipe line. Offset torch-holders arms 15ᵃ may be used to clear the spring tubes 5 and the axle 8, when the torch or torches are disposed in this manner.

Placing the torch clamps 14 at a skew to the arms 15, enables the cutting jet to act at a forward inclination to the circular wall of the pipe, as indicated in Fig. 5, where the nozzle only of the torch is shown lined up with the holder. This causes the oxygen jet to attack always a feather edge at the surface, which greatly increases the speed of cutting and has much to do with its success in this kind of an operation.

Provision of torch-holders on both sides of the carriage saves much time, since the carriage can be so easily shifted from one end of a pipe section to the opposite end without unfastening the sprocket chain. The torch-holders can be slanted for lead of cut in the same direction at both sides of the carriage or in reverse directions, as will be apparent from Figs. 3 and 4, and such "right-hand" and "left-hand" holders are interchangeable.

We claim:

1. A torch apparatus for cutting or welding pipe, comprising a torch carriage, a slinging pipe, comprising the pipe and carriage for holding around the pipe and carriage for holding and guiding the carriage on the pipe, wheels supporting the carriage on the pipe, and a guide member on the carriage, the sling passing over and contacting with the guide member to hold the carriage on the pipe, and the carriage being sufficiently controlled in the sling so that the carriage can be operated by direct hand actuation.

2. A torch apparatus for cutting or welding pipe, comprising a wheeled torch carriage and a revolving sling to hold and guide the same on the pipe, said carriage consisting of two side pieces, two axle rods rigidly uniting said side pieces, wheels on the projecting ends of said rods, slotted spring tubes united to said side pieces, springs in the tubes, and a sprocket-wheel shaft with its ends in the slotted tubes.

3. A torch apparatus for cutting or welding pipe, comprising a wheeled torch carriage and a revolving sling to hold and guide the same on the pipe, said carriage consisting of two side pieces, two axle rods rigidly uniting said side pieces, wheels on the projecting ends of said rods, slotted spring tubes united to said side pieces, springs in the tubes, a sprocket-wheel shaft with its ends in the slotted tubes, wing brackets united to the side pieces, and torch-holders pivoted to said brackets.

4. A torch apparatus for cutting or welding pipe, comprising a wheeled torch carriage and a revolving sling to hold and guide the same on the pipe, a bracket on the side of said carriage, a torch-holder pivoted to said bracket, and means for locking the torch-holder to the bracket at any one of a number of predetermined positions angular to the plane of the weld or cut.

5. A torch apparatus for cutting or welding pipe, comprising a wheeled torch carriage and a revolving sling to hold and guide the same on the pipe, a bracket on the side of said carriage, a torch-holder pivoted to said bracket, said torch-holder comprising an arm and a torch collar fixed to said arm at a skew giving the torch jet an angle of lead in attacking the wall of the pipe.

6. A torch apparatus for cutting or welding pipe, comprising a wheeled torch carriage and a revolving sling to hold and guide the same on the pipe, and torch holders for supporting torches at opposite sides of the carriage and shiftable to support the torches between the sides of the carriage.

WILLIAM R. OST.
FRANK S. LAWRENCE.